United States Patent [19]

Sekimoto

[11] 4,392,719
[45] Jul. 12, 1983

[54] IMAGE FORMING METHOD AND APPARATUS

[75] Inventor: Sohichi Sekimoto, Kanagawa, Japan

[73] Assignee: Fuji Xerox Co., Ltd., Tokyo, Japan

[21] Appl. No.: 169,079

[22] Filed: Jul. 15, 1980

[30] Foreign Application Priority Data

Jul. 19, 1979 [JP] Japan .................. 54-91005

[51] Int. Cl.³ .............................. G02F 1/13
[52] U.S. Cl. .................. 350/342; 350/332
[58] Field of Search ............ 350/342; 355/3 R, 3 TE, 355/16; 430/20, 31

[56] References Cited

U.S. PATENT DOCUMENTS

| | | | |
|---|---|---|---|
| 3,761,171 | 9/1973 | Fields | 350/342 X |
| 3,778,149 | 12/1973 | Fields | 350/342 X |
| 3,798,452 | 3/1974 | Spitz et al. | 350/342 X |

OTHER PUBLICATIONS

Conference, 1972 SID Symposium, Digest of Technical Papers, San Francisco, Calif., USA (6-8 Jun. 1972), A. D. Jacobson, "Photoactivated Liquid Crystal Light Valves", pp. 70-71.

*Primary Examiner*—John K. Corbin
*Assistant Examiner*—David Lewis
*Attorney, Agent, or Firm*—Sughrue, Mion, Zinn, Macpeack, and Seas

[57] ABSTRACT

An image forming method and device for use in a document copier in which an optical image is projected upon a memory liquid crystal cell. A voltage is applied to the cell to determine whether the image recorded thereupon is a positive or negative image. The image recorded upon the memory liquid crystal cell is then projected upon a recording medium. A second image can be combined with that from the memory liquid crystal cell and projected therewith onto the recording medium.

2 Claims, 10 Drawing Figures

FIG. 4A
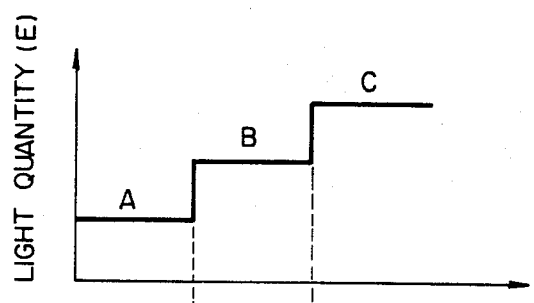
FIG. 4B
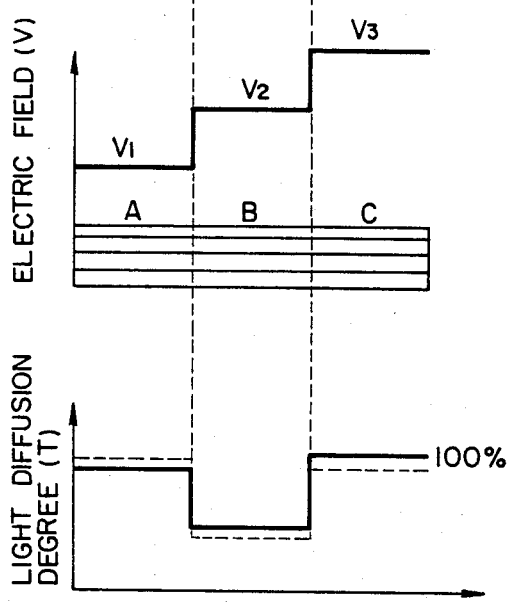
FIG. 4C

IMAGE FORMING METHOD AND APPARATUS

BACKGROUND OF THE INVENTION

The present invention relates to a copying method which is capable of selecting a positive-to-positive image or a negative-to-positive image as desired without changing the polarity of a developer or a charger. More particularly, the invention relates to an image forming method using an intermediate recording medium which permits free selection of a negative image or a positive image of an original by selectively setting a voltage applied.

Among the conventional copying methods adapted to produce a positive-to-positive image or a negative-to-positive image a process is known which is carried out by preparing two different types of positive and negative developers and changing the transfer polarity at each transfer step. Another known process is effected by preparing a sensitive medium of joined P-type and N-type semiconductors or a sensitive medium composed of a semiconductor of one conductivity type and a transparent dielectric joined thereto or a bipolar sensitive medium and switching the charging polarity to positive or negative to execute positive development or reversal development using only one type of developer thereby obtaining a negative-to-positive image or a positive-to-positive image as desired. In the first-mentioned process, however, there exists a disadvantage of requiring two devices while the second-mentioned process has problems regarding the points of the change in polarity, positive and negative charging characteristics, image quality, production cost and so forth. Therefore, neither of the above-described processes has found application on a wide-scale industrial basis.

In the specification of Japanese Patent Application No. 41303/1978 filed by the instant applicant there is disclosed a copying machine which employs an intermediate recording medium to form an image on its specular and diffusive regions and reads out the image by optically selecting a specular reflection pattern or a diffusive reflection pattern from which is produced a negative or positive image. In this machine, there is a great difference in the quantity of light between the specular reflection pattern and the diffusive reflection pattern so that, in case a single light source is used for reading out the pattern, it becomes necessary to reduce the quantity of the specular reflection light by use of a neutral density filter or a diaphragm for equalizing the quantity of specular reflection light to the quantity of the diffusive reflection light. Because of the presence of the filter, a considerable loss of the light is unavoidable. If no neutral density filter or diaphragm is used, some voltage switching means is required to change the quantity of light in two steps. Consequently, the above machine does not provide a large quantity of light in all circumstances and has the difficulty of forming an image on a medium of low-sensitivity material.

SUMMARY OF THE INVENTION

It is thus an object of the present invention to provide an improved image forming method which is capable of producing a negative-to-positive image or a positive-to-positive image easily without changing the charging polarity, developer polarity or the charging characteristics of a photosensitive medium in electrophotography.

Another object of the invention resides in providing an image forming method for producing a negative-to-positive image or a positive-to-positive image by means of a fixed optical reading system without changing the reading mode thereof.

These objects of the invention are attained by an image forming method which includes the steps of irradiating an optical image upon a recording medium composed of a memory liquid crystal, forming a visible image on the memory according to the field effect while controlling the intensity of the electric field applied thereby selecting either a negative image or a positive image from the same light quantity distribution of the optical image.

BRIEF DESCRIPTION OF THE DRAWINGS

FIGS. 4A–4C graphically represent, respectively, a light quantity distribution, an electric field distribution of the liquid crystal cell, and a light transmittance of a liquid crystal cell of the invention;

DESCRIPTION OF THE PREFERRED EMBODIMENTS

Figure 1:
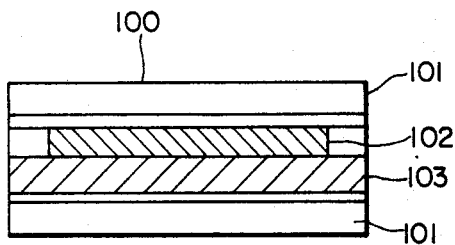
FIG. 1 shows the structure of a memory liquid crystal cell used as an intermediate recording medium in the present invention.
Figure 2:
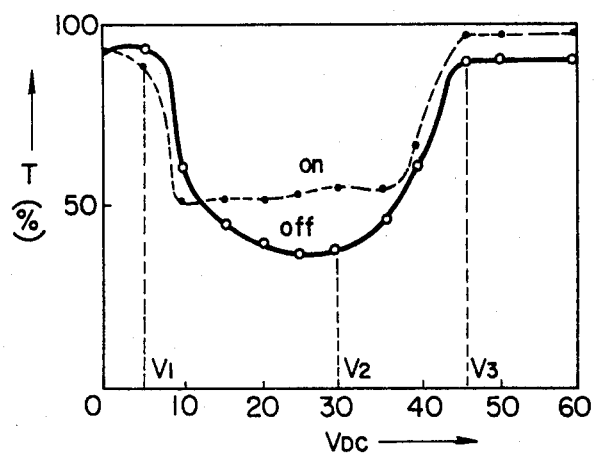
FIG. 2 graphically represents a voltage-to-transmittance characteristic curve of the memory liquid crystal cell.
Figure 3:
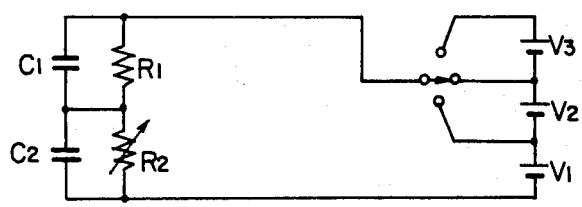
FIG. 3 is a diagram showing an equivalent drive circuit for the liquid crystal cell.

FIG. 1 illustrates the structure of an intermediate recording medium employed in the present invention in which a memory liquid crystal layer 102 and a photoconductive layer 103 for writing a secondary optical image are sandwiched between two transparent electrode plates 101 to constitute a memory liquid crystal cell 100. The liquid crystal used in this example is of nematic-cholesteric phase transition type obtained by mixing a nematic liquid crystal and a cholesteric liquid crystal at a ratio, for example, of 9:1. This ratio, however, is not a limiting value. It is known that such a mixed liquid crystal has a transmittance versus bias voltage characteristic curve as shown in FIG. 2 for Nesa glass the surface of which has been coated with a suitable vertically-oriented processing agent. The present invention utilizes the field-to-transmittance characteristics of the liquid crystal. An equivalent circuit of the recording medium unit is shown in FIG. 3 in which C1 and R1 are the capacitive component and volume resistance of the liquid crystal cell, C2 and R2 are those of the photosensitive layer, and V1, V2 and V3, respectively, denote the voltage at which the liquid crystal causes no electro-optical effect as shown in FIG. 2, the voltage at which the electro-optical effect becomes a maximum, and the voltage at which the transmittance becomes a maximum. The liquid crystal layer 102 is rendered transparent or opaque by selectively setting to V1, V2 or V3 the bias voltage which is applied between the electrodes 101.

Consequently, according to the present invention, a positive (front) image or a negative (reversal) image is obtainable by focusing an optical image upon a memory liquid crystal cell and then setting bias voltages, which are applied to a nonexposed region and an exposed region, by selecting one of a combination of bias voltages V1 and V2 or a combination of bias voltages V2 and V3.

A specific advantageous feature of the image forming method according to the present invention resides in the use of such an intermediate-recording liquid crystal cell having predetermined voltage (electric field)-to-transmittance characteristics in performing a copying operation. An apparatus suited for practicing the method of invention includes, as shown in FIG. 5, an enlarged-size copying system 2, an equimagnification copying system 3, the liquid crystal cell disposed on the optical axis of each system, a light source 16 and a lens 18 provided for reading the recorded content formed on the liquid crystal cell, and a half-silvered mirror 17 provided for reading the reflected light directly.

Description will first be given of the image forming process using a memory liquid crystal according to the principles of the present invention. The liquid crystal employed here is of phase transition type that is composed of a nematic liquid crystal and a cholesteric liquid crystal mixed at a ratio of 9:1 while the nematic crystal is a mixture of MBBA (p-methoxybenzylidene-p'-n-butyl aniline), EBBA (p-ethoxybenzylidene-p'-n-butyl aniline) and PEBAB (p-ethoxybenzylidene-P'-amino benzonitrile) in a ratio of 50:35:15 and the cholesteric liquid crystal may be COC (cholesterile oleyl carbonate). A liquid crystal of this type is formed into a planar structure in which the crystal molecules in the vicinity of an electrode of glass such as Nesa glass are arrayed perpendicular thereto in an initial no-load state and the molecules in the intermediate layer are arrayed parallel to the electrode while being twisted spirally. In this state, the bias voltage is lower than V1 of FIG. 2 with the optical transparency being kept above 90 percent. When the voltage V2 is subsequently applied, the planar structure is broken down so that the liquid crystal molecules are arrayed parallel to the electrode to form a focal conic structure (a particular conic constitution of cholesteric liquid crystal) with the spiral axis thereof rotated by 90 degrees thereby resulting in an optical diffusive state. This state is maintained even after removal of the applied voltage V2. When the voltage is further changed to V3, the molecular array is rotated into a homeotropic structure in which the entire molecules are oriented uniformly perpendicular to the electrode. The light transmittance is nearly 100 percent at the application of V3 returning to the initial value, about 90 percent, after the lapse of several seconds following removal of the applied voltage. Utilizing such characteristics, as shown in FIG. 4, an optical pattern having light quantity distributions A, B and C is projected on the photosensitive layer of the liquid crystal cell in such a manner that the electric field applied to the liquid crystal layer thereof becomes successively V1 (V/m), V2 (V/m) and V3 (V/m). In the liquid crystal regions superposed on the photosensitive layer corresponding to the light quantity distributions A, B and C, the transmittance distributions are changed from the curves of FIG. 2 to those of FIG. 4C and are kept in such state even after removal of the voltages V1–V3 as shown by dotted lines.

In general, a document to be copied is composed of a white or black base and black or white lines. In an example where a positive document having a white base and black lines is exposed and the quantity of light reflected by the white base and the quantity of light reflected by the black base are at the levels C and B shown in FIG. 4A, respectively, if the power source voltage V is set so that V3 is applied to the white base while V2 is applied to the black region, the region C of the liquid crystal is rendered transparent with the region B becoming optically diffusive thereby forming a negative image on the liquid crystal cell.

Figure 5:
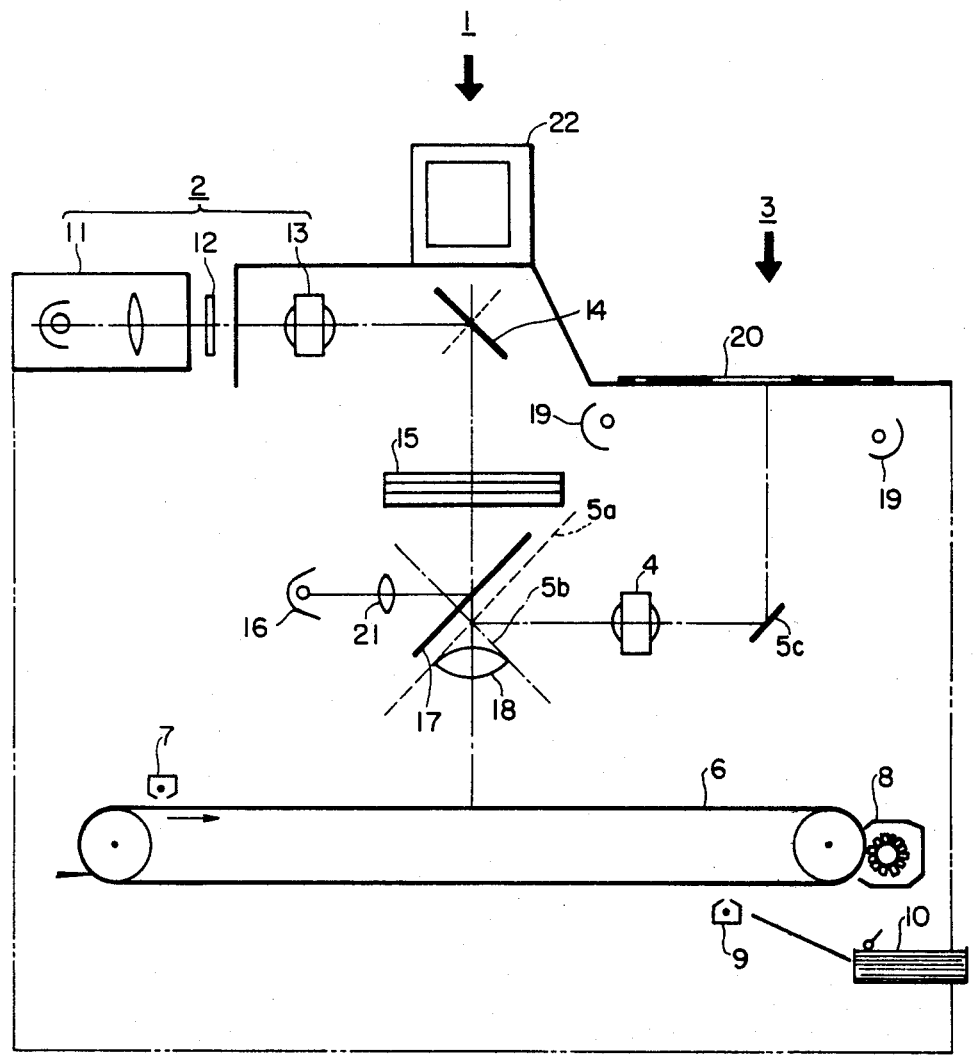
FIG. 5 is a schematic diagram of an apparatus for practicing the present invention.

In the case where an original such as a negative film having a transparent character region B and an opaque background C is exposed to the light transmitted from an enlarging copying system as shown in FIG. 5, the voltage of the power source is set so that the electric field applied to the liquid crystal layer according to the quantity of light in the transparent region B is V2 and the electric field applied according to the quantity of light in the opaque region C is V1. Then the character region B of the liquid crystal is rendered optically diffusive while the background C is rendered transparent to thereby form a negative image on the liquid crystal cell.

Some specific examples will be given below. The Nesa glass used is equipped with a transparent electrode of $In_2O_3$ formed with a thickness of 1,000 angstroms on a thin glass plate by vacuum sputtering and oxidation by application of heat, the photosensitive layer is formed by vacuum-evaporating $As_2Se_3$ to form a layer having a thickness of 2 microns, and the liquid cell produced by initially drawing under vacuum a nematic-cholesteric phase transition type liquid crystal to form a layer having a thickness of 12 microns and then forming a thin film of lecithin (orientation agent) to a thickness of 3,000 angstroms by dip coating to thereby achieve orientation. By the use of such a liquid crystal cell, an image was recorded with the quantity of light so determined that the bright region of the image was 100 luxes. As a result, a negative image was obtained on the liquid crystal cell from a positive document at a supply voltage of 60 volts. Also, a negative image was obtained on the cell from a negative film at a supply voltage of 45 volts.

A copying machine employed for the method of the present invention is of the type having both an enlarging negative-to-positive copying function and an equimagnification positive-to-positive copying function and having a commonly provided electrophotographic mechanism. On the common optical axis of the dual copying system, there is disposed an intermediate recording medium which is capable of producing a negative image with its character region producing optical diffusion, regardless of whether a negative or positive is used, by the control of the voltage applied while further an optical read system is provided for reading the recorded image directly using reflected light.

Figure 6A:
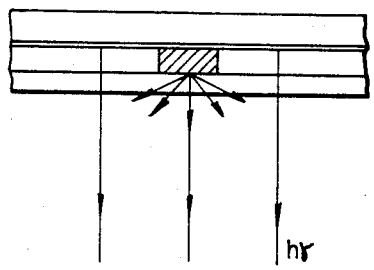
FIG. 6 A is a diagram illustrating a state in which an image on an intermediate recording medium is read out by direct reflected light and FIG. 6B shows the light quantity distribution of the image in FIG. 6A.
Figure 6B:
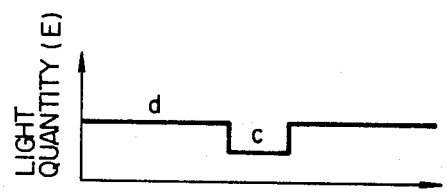

Referring now to FIG. 5 which shows an apparatus for implementing the method of the present invention, a film 12 to be copied is projected by means of a projector 11 in an enlarging optical system 2 with its optical image passing through a lens 13 and then being reflected by a mirror 14. The image contents of the film 12 is recorded as a negative image on a memory liquid crystal cell 15 by the method described above. A photosensitive medium 6 composed of a memory liquid crystal cell has a metallic surface as viewed from a light source 16. The image contents recorded on the memory liquid crystal cell 15 is illuminated by light from the read light source 16 reflected by the half-silvered mirror 17. The light reflected by from the memory liquid crystal cell is projected via the half-silvered mirror 17 onto the photosensitive medium 6 by a read lens 18. When projection of an image is effected by directly reflected on the crystal liquid cell causes optical diffusion in the image region of the liquid crystal cell as shown in FIG. 6A while direct reflection of the light occurs at the specular surface of the photoconductive layer 103 in regions other than the image region as a result of which the light quantity distribution of FIG. 6B is attained on the photosensitive medium 6.

Figure 7:
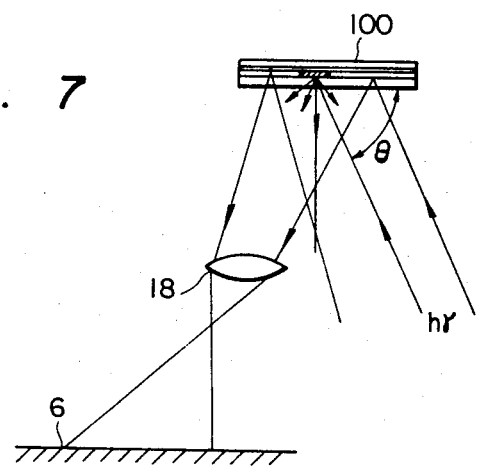
FIG. 7 is a diagram illustrating the oblique illumination of an intermediate recording medium.

As a cloudy (light-diffused) region has directionality to some degree in a liquid crystal, oblique irradiation of the light can be performed by a lens system as shown in FIG. 7 and the directly reflected light therefrom utilized. The light irradiation angle $\theta$ is determined depending on the base plate of the cell, the Nesa glass film and diffusion anisotropy of the liquid crystal and such parameter. In our experiments, satisfactory results were obtained at angles greater than 45 degrees.

As shown in FIG. 5, in opaque original 20 placed on a platen is illuminated with light from a light source 19 with the reflected light therefrom passing through a mirror 5c, a lens 4 and a mirror 5b as shown by a chain line to project the contents of the opaque original onto an intermediate recording medium 15 for a negative original. The contents thus recorded is further projected onto the photosensitive medium 6 by the aforementioned method then processed in subsequent development, transfer and fixing steps. In this system, a negative image is recorded on the intermediate recording medium regardless of whether the original is negative or positive.

Referring back to FIG. 5, the opaque image is positive, the reflected light therefrom advances via the mirror 5c, the lens 4 and the mirror 5a as shown by a broken line and then is projected directly onto the photosensitive medium 6 without striking the intermediate recording medium so that no latent image is formed. In this case, operations are performed exactly in the same manner as in an ordinary copying machine where a hard copy is obtained using an ordinary xerographic process.

Regarding the method for forming an optical pattern on the intermediate recording medium, in addition to direct optical focusing of the original image onto the intermediate recording medium, other techniques are available such as scanning with pulse signals corresponding to the image and producing images according to the output of a computer or facsimile equipment or using an electron beam of a cathode-ray tube.

Besides the foregoing electrophotographic sensitive medium employed in the copying process to produce a copy from an optical pattern formed on the intermediate recording medium of the present invention, it is to be understood that a silver-salt photosensitive medium or any other suitable non-silver-salt photosensitive medium may be used as well.

In that images from either of the enlarging optical system 2 and the equi-magnification or reduced-size optical system 3 can be simultaneously written on an intermediate recording medium, a superposition-copying operation of two or more originals is made possible which is useful for various applications including correction and combination of images.

As described hereinabove, the present invention is capable of recording a negative image (or a positive image in case the copying mechanism is intended for negative use) regardless of whether the original is positive or negative hence enabling the image to be read out using light reflected from a specular surface. Reduction in the quantity of reading light is necessarily attained. Moreover, since a positive image is obtainable with ease from any of a negative film, a positive film, a positive opaque document and a negative opaque document, it is possible to combine a microprinter with an equi-magnification printer in a single system to provide a micro/opaque printer capable of producing a positive image. Yet further, it is possible to record the image of a film and the contents of an opaque document in a superposed fashion.

What is claimed is:

1. A system for forming an image onto a photosensitive recording medium comprising:
    a memory liquid crystal cell having a layer of nematic-cholesteric phase transition type memory liquid crystals, a photoconductive layer disposed adjacent said memory liquid crystal layer, and transparent electrodes sandwiching said memory liquid crystal layer and said photoconductive layer;
    means for projecting an optical image onto said memory liquid crystal cell comprising first means to project a positive original optical image on said memory liquid crystal cell for recording as a latent image and second means for projecting a negative original optical image either onto said memory liquid crystal cell as a latent image or onto said photosensitive recording medium without forming a latent image;
    means for applying a predetermined voltage to said memory liquid crystal cell to determine the polarity of an image recorded thereon; wherein said means for applying a predetermined voltage comprises, a voltage source and circuit means for applying a bias voltage from said source having a polarity determined by whether the original image is a positive or negative original optical image
    means for projecting an optical image from said memory liquid crystal cell to said photosensitive recording medium comprising a light source, a first lens, a half-silvered mirror positioned to direct light from said light source focused through said first lens onto the surface of said memory liquid crystal cell, and a second lens receiving light transmitted through said half-silvered mirror and focusing it onto said photosensitive recording medium.

2. The recording device of claim 1 further comprising means for combining an image with the image transmitted through said half-silvered mirror.

* * * * *